United States Patent [19]
Windischman et al.

[11] 3,752,510
[45] Aug. 14, 1973

[54] STRUCTURE FOR CONNECTING A FLEXIBLE TUBE TO A SYRINGE

[75] Inventors: Edward F. Windischman, Daytona Beach, Fla.; John M. Chambers, Manchester, Mo.; Howard E. Werner, Deland, Fla.

[73] Assignee: Sherwood Medical Industries, Inc., St. Louis, Mo.

[22] Filed: Oct. 7, 1971

[21] Appl. No.: 187,471

[52] U.S. Cl............ 285/334.4, 128/214.4, 285/322, 285/423
[51] Int. Cl............................................. F16l 25/00
[58] Field of Search................. 285/343, 423, 334.4, 285/322, 382.7, 323, 248, 249; 128/248, 214.4, 218 N

[56] References Cited
UNITED STATES PATENTS

| | | |
|---|---|---|
| 3,501,177 | 3/1970 | Jacobs ............................. 285/322 |
| 3,633,579 | 1/1972 | Alley................................ 128/214.4 |
| 2,374,284 | 4/1945 | Hall ................................. 285/334.4 |
| 1,712,273 | 5/1929 | Kennedy............................. 285/323 |
| 2,098,581 | 11/1937 | Jones ................................ 174/84 R |
| 3,243,207 | 3/1966 | Carpenter et al.................... 285/248 |
| 3,476,412 | 11/1969 | Demler.......................... 285/343 X |
| 3,542,024 | 11/1970 | Burke ......................... 285/334.4 X |

Primary Examiner—Dave W. Arola
Attorney—Stanley N. Garber and William R. O'Meara

[57] ABSTRACT

A connector structure for connecting a flexible tube end to a syringe having a luer tip including a plastic hub having a bore therethrough and connected to the tip, a retainer in the hub bore for retaining the tube end therein, and a plastic bushing arranged to constrict the retainer about the tube end to effect sealed frictional retention of the tube in the hub. A construction is disclosed in which the retainer and tube end are urged into a tapered bore portion of the hub bore by the bushing, and another construction in which the bushing constricts a hub portion about the retainer and tube.

8 Claims, 8 Drawing Figures

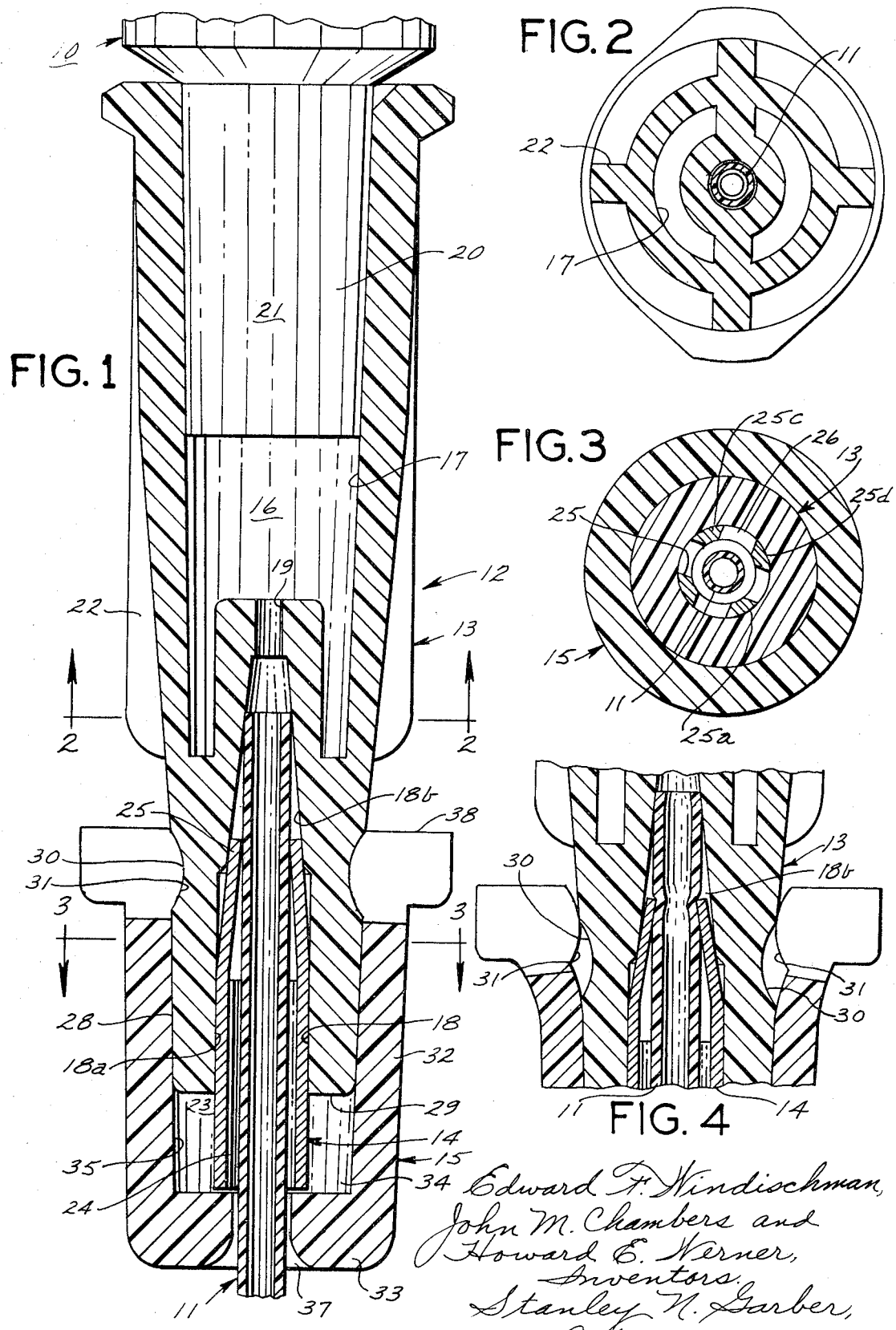

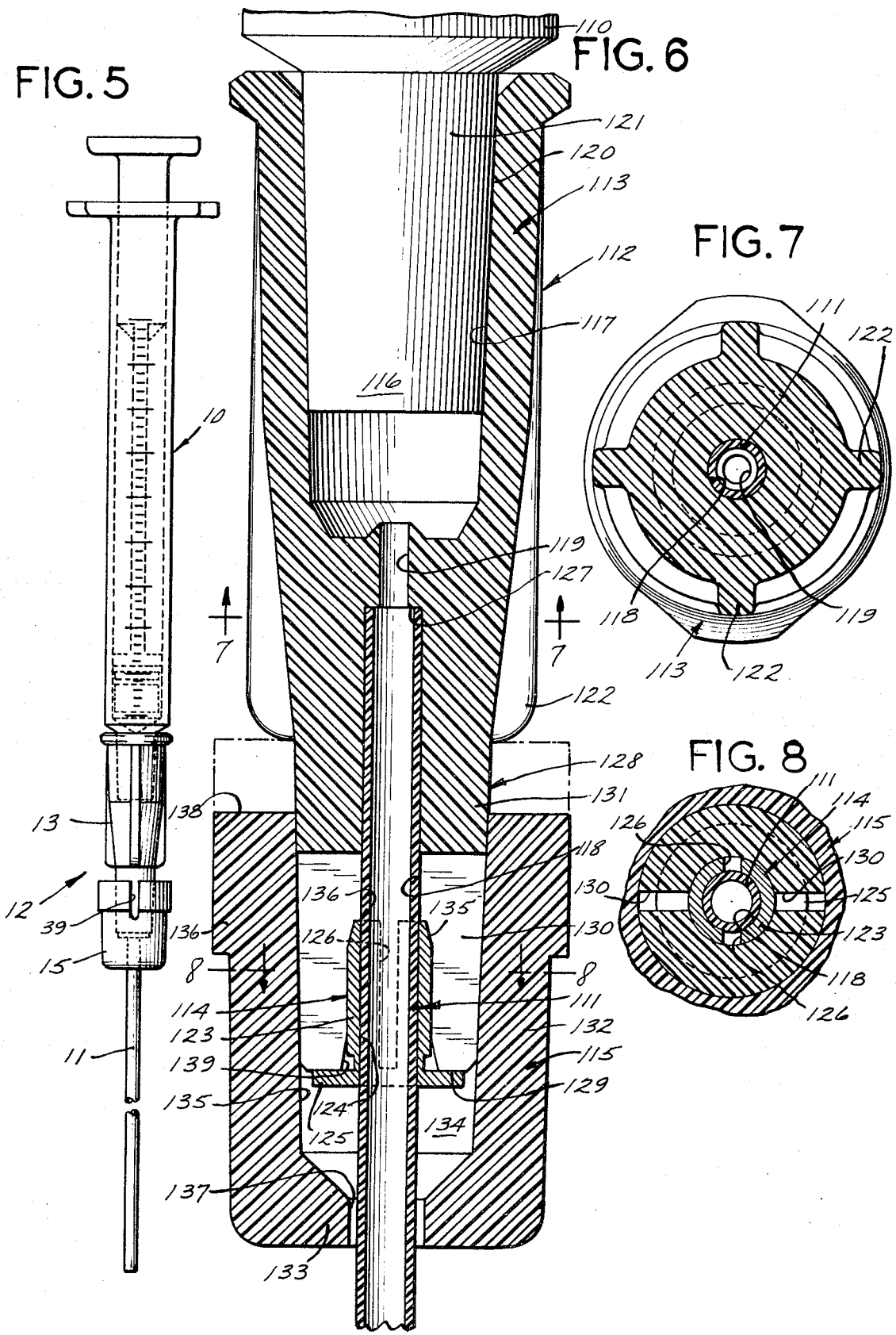

STRUCTURE FOR CONNECTING A FLEXIBLE TUBE TO A SYRINGE

BACKGROUND OF THE INVENTION

1. Field of the Invention

This invention relates to connector structure for medical devices, and more particularly to a connector structure for connecting flexible tubing to syringes, such as hypodermic syringes.

2. Description of the Prior Art

In one form of medical device utilizing a flexible tube connected to a syringe element, the tube is retained in association with the syringe by means of a flared end on the tube seating against a tapered shoulder on the syringe connector structure. In another form of conventional structure for connecting flexible tubing in medical devices, the tubing is stretched over a tubular connecting portion. Each of these conventional constructions requires undesirable stretched deformation of the tube.

SUMMARY OF THE INVENTION

It is therefore an object of the present invention to provide an improved connector structure for connecting flexible tubing to a syringe wherein the connector is extremely simple and economical in construction while yet providing a secure fluid tight connection.

In accordance with the present invention a connector structure for connecting a flexible tube to a hypodermic syringe is provided which includes a tubular means adapted to be secured to the end of a syringe, means in the tubular means for retaining the tube end therein, and constricting means adapted to constrict the retaining means for effecting sealed frictional retention of the tube end in the tubular means.

BRIEF DESCRIPTION OF THE DRAWING

Other features and advantages of the invention will be apparent from the following description taken in connection with the accompanying drawing wherein:

FIG. 1 is a fragmentary enlarged vertical sectional view of a syringe with a flexible tube positioned to be in fluid communication thereto by means of a connecting structure embodying the invention;

FIG. 2 is a sectional view taken along the line 2—2 of FIG. 1;

FIG. 3 is a sectional view taken substantially along the line 3—3 of FIG. 1;

FIG. 4 is a fragmentary enlarged vertical sectional view showing the connecting structure in an operable connected condition;

FIG. 5 is a front elevational view of the entire syringe with the connecting structure of FIG. 1;

FIG. 6 is a fragmentary, enlarged, vertical sectional view of a syringe having a flexible tube connected thereto by means of a connecting structure of modified construction;

FIG. 7 is a sectional view taken along line 7—7 of FIG. 5; and

FIG. 8 is a sectional view taken along line 8—8 of FIG. 5.

DESCRIPTION OF THE PREFERRED EMBODIMENTS

In the exemplary embodiment of the invention as shown in FIGS. 1 through 5 of the drawing, a hypodermic syringe, generally designated 10 in FIGS. 1 and 5, is shown with a length of flexible tubing 11 for connection therewith by an improved connecting structure generally designated 12. As best seen in FIG. 1, the connector 12 is shown in the form of a molded plastic device of extremely simple and economical construction having an improved retaining means providing for the facilitated attachment of the end of tube 11 to the syringe 10 such as for use in medical applications. Illustratively, the apparatus may be utilized for withdrawing or injecting fluids into or from the syringe 10 through the tube 11.

Connector 12 includes tubular means defined by a hub generally designated 13 and a tube retaining eyelet or collet 14, and a bushing generally designated 15 cooperatively associated to effect, in the finally assembled condition of the apparatus, a sealed retention of the end portion of the tube 11 thereto.

Hub 13 is adapted for use with a conventional syringe construction, and as shown in FIG. 2, includes a through bore generally designated 16 defining an inner end bore portion 17, an outer end bore portion 18, and a bore mid-portion 19 interconnecting inner portion 17 and outer portion 18. Inner bore portion 17 comprises an enlarged inwardly widening frustoconical portion having a configuration corresponding to the configuration of the external surface 20 of the syringe needle-mounting hub or tip 21 to provide a positive locked connection of the connector hub 13 to the needle-mounting tip. The walls of bore portion 17 and surface 20 of tip 21 are shown with complimentary tapers so that they are coupled together by simple telescoped association of the connector hub onto the syringe tip 21. To facilitate the installation, hub 13 is provided with a plurality of ribs 22 adapted to be engaged by the user's fingers for manipulating connector hub 13 whereby the connector hub may be longitudinally installed on the syringe tip 21 and turned to effect the desired locking. Thus, the syringe tip 21 may comprise a conventional luer slip hub having an included taper angle of 3° 26' 12" and the connector hub portion 17 may have a similar included angle.

Bore portion 18 has a cylindrical outer portion 18a with a diameter substantially larger than the outer diameter of the end of tube 11 so as to receive an outer cylindrical portion 23 of collet 14 which has a bore 24 with a diameter preselected so that the tube end may be freely inserted into it. The bore portion 18 also has an inwardly narrowing frustoconical or tapered inner bore portion 18b which receives in tight fitting relation, in the operative position, an inner frustoconical portion 25 of collet 14. As seen also in FIG. 3, the collet portion 25 is shown having a plurality of longitudinal slots 26 for facilitating construction thereof and which form four resilient fingers 25a–25d.

The outer or distal end of hub 13 concentrically surrounding bore 18 includes a longitudinal generally frustoconical outer end portion 28 narrowing outwardly to the distal end 29 of the connector hub 13 and snugly received in the bushing 15. The outer end portion 28 of the connector hub is provided with an annular recess 30 in the outer surface thereof which, preliminary to complete operable assembly, receives a radially inwardly extending annular bead 31 formed on the inside of the bushing 15 at the inner end thereof for locking the bushing 15 onto the hub 13 to hold these parts and collet 14 together during handling and storage thereof before connection with a syringe and tube.

Bushing 15 is shown in a form of a cup-shaped element having a side wall portion 32 and an inturned wall portion 33. The side wall portion 32 and annular bead 31 are shown slotted such as by four equally spaced slots 39 (one shown in FIG. 5) to provide four equally spaced radially inwardly extending protrusions or bead sections. The bushing defines a recess 34 having a frustoconical side wall 35 corresponding to the frustoconical surface 28 of the connector hub from which the bead 31 extends. Surfaces 28 and 35 may be similar in configuration to surfaces 17 and 20 and thus may define an included luer taper angle of 3° 26′ 12″. The bushing may include radially outwardly extending fins 36 to facilitate the manual gripping thereof. End wall 33 is provided with axially opening 37 having a diameter slightly larger than the outer diameter of tube 11 to permit passage of the tube end therethrough into the hub bore portions 18a and 18b, but smaller than the diameter of collet 14.

The hub 13 and bushing 15 of connector 12 may be formed of molded plastic. Illustratively, these elements may be formed of a thermoplastic material such as polypropylene that will provide extremely low costs while permitting facilitated sterility. Collet 14 may be formed of a resilient material, preferably of a suitable metal such as nickel plated brass. Tube 11 is also formed of a suitable plastic material.

The use of connector 12 in connecting flexible tube 11 to the syringe 10 is extremely simple. With the connector 12 in its preoperative assembled condition, such as shown FIG. 1, wherein the bead 31 of bushing 15 is disposed in the hub groove 30, the hub 13 may be grasped and inserted onto the syringe by insertion of tip 13 may be grasped and inserted onto the syringe by insertion of tip 21 into bore portion 17. The tube 11 may then be inserted through opening 37 in bushing 15 and through opening 24 in collet 14 which is disposed in bore 18 of the hub 13. The tube 11 may be inserted into connector 12 until it engages the side walls of bore portion 18b. With the tube 11 positioned as shown in FIG. 1, the bushing 15 may be manually grasped and moved axially inwardly, for example, until bead 30 is moved out of the hub groove 31 and is in tight frictional holding engagement with the hub 13, as is shown in FIG. 4. During this movement of the bushing 15, the inner side of lower wall 33 of the bushing engages the outer end of the collet 14 and moves it further into the tapered bore 18b causing collet 14 to be wedged into frictional engagement with the walls of bore portion 18 and the end 25 and fingers 25a-25d to move radially inwardly to engage and move the tube 11. The tube 11 is moved inwardly by the collet 14 toward the narrow end of tapered bore portion 18b so that is also wedged in bore portion 18b. As seen in FIG. 4, the outer surface of tube 11 adjacent the inner end thereof sealingly engages the walls of bore portion 18b so that the tube is in fixed fluid-tight relation with the hub 13 and in fluid communication with bore 16 and the chamber of the syringe 10. In the illustrated embodiment, the collet 14 is shown slightly pinching the tube 11 with the ends of fingers 25a-25d slightly biting into the outer wall of the tube, and this prevents retraction of the tube upon the occurence of an applied pulling force on the tube. In this way, the tube 11 is maintained in fluid-tight communication with the syringe 10 so that the syringe plunger can be operated to draw in or deliver fluid through tube 11.

In the exemplary modified embodiment of the invention shown in FIGS. 6, 7 and 8 of the drawings, a hypodermic syringe generally designated 110 is shown to have a length of flexible tubing 111 in position to be connected thereto by an improved connecting structure generally designated 112. The connector 112 preferably comprises a molded plastic device of extremely simple and economical construction having an improved retaining means providing for facilitated attachment of the tube end to the syringe such as for use in medical applications. Illustratively, the apparatus may be utilized for withdrawing or injecting fluids into or from the syringe 110 through the tube 111.

As best seen in FIGS. 6 and 8, connector 112 includes a tubular means defined by a hub generally designated 113 and a collet or eyelet 114, and a bushing generally designated 115 cooperatively associated to effect a sealed retention of the end portion of tube 111 thereto. Hub 113 is adapted for use with a conventional syringe construction, and, as shown in FIG. 6, includes a through bore generally designated 116 defining an inner end bore portion 117, and outer end bore portion 118, and a bore mid-portion 119 interconnecting inner portion 117 and outer portion 118. Inner bore portion 117 comprises an enlarged inwardly widening frustoconical portion having a configuration corresponding to the configuration of the external surface 120 of the syringe needle-mounting hub, or tip, 121 to provide a positive locked connection of the connector hub to the needle-mounting hub by simple telescoped association of the connector hub 113 onto the syringe tip 121. To facilitate the installtion, hub 113 is provided with a plurality of ribs 122 adapted to be engaged by the user's fingers for manipulating connector hub 113 whereby the connector hub may be longitudinally installed on the syringe tip 121 and turned to effect the desired locking. Thus, the syringe tip 121 may comprise a conventional luer slip hub having an included taper angle of 3° 26′ 12″ and the connector hub bore portion 117 may have a similar included angle.

Outer bore portion 118 preferably has a diameter substantially larger than the outer diameter of the tube end 111 to snugly receive the shank portion 123 of eyelet 114 with the bore 124 of the eyelet having a diameter preselected so that the tube end may be freely inserted thereinto. Eyelet 114 further includes an outer radial flange 125. Shank portion 123 may be provided with longitudinal slots 126 for facilitating constriction thereof. As shown in FIG. 6, mid-portion 119 of bore 116 is of reduced diameter whereby the hub defines an annular radial shoulder 127 at the inner end of outer bore portion 118 limiting the longitudinal movement of the tube end 111 into the hub.

The outer end of hub 113 concentrically surrounding bore end 118 includes a longitudinal inner frustoconical outer surface 128 narrowing outwardly to the distal end 129 of the connector hub 113. A plurality of longitudinal slots 130 is provided in the connector hub extending inwardly from the distal end 129 to provide for facilitated constriction thereof. The slots extend only partially the length of the frustoconical surface 128 so that the outer end of the connector hub further defines a continuously annular portion 131 longitudinally inwardly of the slotted distal portion. Portion 131 of the connector hub may terminate at the outer end of ribs 122, as shown in FIG. 6.

As indicated briefly above, the outer end of the tubular means defined by the connector hub 113 and eyelet 114 is constricted by the bushing 115 to effect the desired sealed retention of the tube end 111 in the outer bore portion 118. More specifically, bushing 115 comprises a cup-shaped element having a sidewall portion 132 and an inturned end wall portion 133. The bushing defines a recess 134 having a frustoconical sidewall 135 corresponding to the frustoconical surface 128 of the connector hub. Surfaces 128 and 135 may be similar in configuration to surfaces 117 and 120 and, thus, may define an included luer taper angle of 3° 26′ 12″. The bushing may include a radially thickened inner end 136 for improved constriction of the nonslotted portion 131 of the connector hub outer end. Inturned end wall 133 is provided with an axial opening 137 having a diameter preferably slightly larger than the outer diameter of tube end 111 for facilitated passage of the tube end therethrough into the hub bore portion 118 and thereby permitting facilitated telescopic mounting of the bushing on connector hub surface 128.

As shown in FIG. 6, the enlarged end 136 of bushing 115 defines a planar inner end surface 138 which is arranged to abut the outer ends of ribs 122 in the fully installed position of the bushing on the connector hub as shown in broken lines.

Bore portion 118 may be provided with a flared entrance portion 139 to facilitate insertion of the tube end 111 therein.

As discussed above, hub 113 and bushing 115 of connector 112 may be formed of molded plastic. Illustratively, these elements may be formed of a thermoplastic such as polypropylene providing extremely low cost while permitting facilitated sterility. Eyelet 114 may be formed of a suitable metal such as brass. In the illustrated embodiment, the eyelet is nickel plated.

The use of connector 112 in connecting flexible tube 111 to the syringe 10 is extremely simple. The user firstly passes tube end 111 through bushing opening 137 and into bore 124 of eyelet 114 which may be received in hub portion 118. Hub 113 may be installed on the syringe hub 121 by telescopically installing the inner end of the connector hub on the syringe hub 121 with the installation being facilitated by the use of ribs 122 as discussed above. The bushing is moved over the end of the tube 111 with the recess 134 opening toward the distal end of the tube. The tube end may be freely inserted into the connector hub bore portion 118 until the end of the tube abuts inner shoulder 127 providing a hit-home indication of the proper installation of the tube end in the eyelet and connector hub. Bushing 115 is then slid telescopically inwardly onto the connector hub surface 128 to effect a constriction of the outer end of the connector hub and eyelet shank portion 123 about the tube end 111 to effectively sealingly retain the tube end in association with the connector hub. The limit of movement controlled by the abutment of bushing shoulder 138 with the ribs 122 effectively prevents an overconstriction of the connector hub thereby assuring proper arrangement of the tube end in the hub bore while yet providing the desired positive retention of the tube end.

The invention comprehends the provision of connector 112 with a tubular means omitting the eyelet whereby the outer portion of the hub at slots 130 may be constricted by the bushing 115 directly into frictional engagement with the outer surface of the tube end 111 to retain the tube. However, to provide improved retention of the tube end in the connector 112, the metal eyelet may be utilized within the outer end of the hub. The inner end of the eyelet is defined by a frustoconical inwardly narrowing surface 135 which defines an edge 136 adapted to bite into the outer surface of the tube end as the result of urging of the tube end axially outwardly therethrough once the tubular tube connecting means is constricted by the bushing 115 as discussed above. Thus, eyelet 114 serves as a mechanical interlock effectively precluding axial withdrawal of the tube end once the connector is made up. The slots 126 of the eyelet permit faciliated constriction of the shank portion 123 upon constriction of the hub portion outwardly thereof by bushing 115 thereby providing facilitated make-up of the connector in connecting the tube end. The eyelet, as discussed above, is formed of a relatively hard material whereas the hub and bushing may be formed of a relatively soft material. As the eyelet is effectively captured between the hub and bushing and effectively interlocks with the tube end, the eyelet provides an improved means for effectively positively retaining the tube end in association with the connector in a novel and simple manner.

When desired, connector hub 113 may be readily removed from the syringe hub 121 by an outward withdrawal movement of the connector hub facilitated by the use of ribs 122.

The foregoing disclosure of specific embodiments is illustrative of the broad inventive concepts comprehended by the invention.

What is claimed is:

1. A structure for connecting a flexible tube in sealed fluid communication with a syringe having a needle-mounting tip with an outer frusto-conical surface having a luer taper included angle of substantially 3° 26′ 12″ comprising a hub having an axial bore therethrough including a first bore portion adjacent the inner end thereof having a frusto-conical surface with a luer taper included angle of substantially 3° 26′ 12″ for receiving a tip in sealed fluid communication with said bore, and a second bore portion adjacent the outer end thereof having frustoconical walls tapering toward said first bore portion, retaining means of resilient metal having an axial inner end portion disposed in said second bore portion, said retaining means having an axial opening therethrough for receiving an end portion of a tube and at least one slot in said inner end portion extending to the axial inner end thereof so that said inner end portion is constrictable, and bushing means coupled to said outer end of said hub for axial movement between first and second positions relative to said hub said bushing means and said hub having, in said first position, means resisting axial movement of said bushing means relative to said hub, said bushing means having an opening for permitting the insertion of a flexible tube through said retaining means and into engagement with said frustoconical walls when said bushing means is in said first position, said bushing means being engageable with the outer end of said retaining means and movable from said first position without rotation relative to said hub to said second position to move said retaining means axially inwardly to urge said inner end portion of said retaining means against said frustoconical walls to constrict said inner end portion of said retaining means about the tube with said retaining means frictionally engaging and urging the tube axially inwardly into wedged sealing engagement with said frusto-conical walls, said inner end portion of said retaining means grippingly engaging the tube when constricted to prevent axially outward movement of the tube from said frusto-conical walls.

2. The structure according to claim 1 wherein said hub is plastic material, and said bushing means is slidable on said hub in an axial straight line between said first and second positions.

3. The structure according to claim 1 wherein said inner end portion of said retaining means is frusto-conical and tapering toward the axially inner end thereof.

4. A structure for connecting a flexible tube in sealed fluid communication with a syringe having a needle-mounting tip with an outer frusto-conical surface with a luer taper included angle of substantially 3° 26' 12'' comprising a plastic hub having an axial bore therethrough including a first bore portion adjacent the inner end thereof being frusto-conical and complementary in shape to the shape of the surface of a tip for receiving a tip in sealed fluid communication with said bore, and a second bore portion adjacent the outer end thereof, said hub outer end having an outer frusto-conical surface, retaining means having at least one slot at the axially inner end thereof defining at least two constrictable portions with said constrictable portions disposed in said second bore portion, said retaining means having an axial opening therethrough for receiving an end portion of a flexible tube adapted for fluid communication with said bore, and plastic bushing means having a recess with frusto-conical side walls for receiving said outer frusto-conical surface of said hub outer end in frictional holding engagement and for effecting constriction of said constrictable portions, said bushing means having an opening in aligned relation with said axial opening for permitting the insertion of a flexible tube through said retaining means and into said second bore portion, said recess having walls in axial sliding engagement with the radial outer surface of said hub outer end, said bushing means being axially slidable from a first position relative to said hub wherein a tube may be passed through said retaining means and into engagement with the walls of said second bore portion to a second position wherein the tube is in sealing engagement with the walls of said second bore portion and said bushing means constricts said hub outer end to constrict said constrictable portions of said retaining means about the tube to prevent axial movement of the tube in a direction outwardly from said second bore portion.

5. A structure for connecting a flexible tube in sealed fluid communication with a syringe having a needle-mounting tip comprising a plastic hub having an axial bore therethrough including a first bore portion adjacent the inner end thereof complementary in shape to the shape of a tip for receiving a tip in sealed fluid communication with said bore, and a second bore portion adjacent the outer end thereof, retaining means having at least one slot at the axially inner end thereof defining at least two constrictable portions with said constrictable portions disposed in said second bore portion, said retaining means having an axial opening therethrough for receiving an end portion of a flexible tube adapted for fluid communication with said bore, and bushing means having a recess receiving said hub outer end and for effecting constriction of said constrictable portions, said bushing having an opening in aligned relation with said axial opening for permitting the insertion of a flexible tube through said retaining means and into said second bore portion, said recess having walls in axial sliding engagement with the radial outer surface of said hub outer end, said bushing means being axially slidable on said hub outer end from a first position relative to said hub wherein a tube may be passed through said retaining means and into engagement with the walls of said second bore portion to a second position to constrict said hub about the tube end portion and said retaining means wherein the tube is in sealing engagement with the walls of said second bore portion and said hub constricts said constrictable portions of said retaining means about the tube to prevent axial movement of the tube in a direction outwardly from said second bore portion.

6. The structure according to claim 5 wherein said hub outer end is tapered, and said bushing means has a tapered recess for receiving said hub opposite end, said bushing means being slidable relative to said hub to constrict said retaining means.

7. The structure according to claim 6 wherein said hub outer end and said retaining means are longitudinally slotted.

8. The structure according to claim 7 wherein said hub has readially outwardly extending ribs thereon engageable with said bushing means for limiting the axial movement of said bushing means relative to said hub, said tip has a luer taper, and said first bore portion is frustoconical for slidingly receiving said tip in fluid-tight holding engagement.

* * * * *